United States Patent Office 3,127,385
Patented Mar. 31, 1964

3,127,385
METHOD OF PRODUCING SUBSTANTIALLY
PURE PROPYLENE POLYMERS
Rino Mostardini and Luciano Luciani, Milan, Italy, assignors to Montecatini Società Generale per l'Industria Mineraria e Chimica, Milan, Italy
No Drawing. Filed Jan. 3, 1958, Ser. No. 706,900
Claims priority, application Italy Jan. 10, 1957
6 Claims. (Cl. 260—93.7)

This invention relates to solid polymers of propylene and more particularly to methods for purifying such polymers.

G. Natta and his co-inventors have disclosed that new, extremely valuable solid polymers of propylene having extraordinary characteristics can be obtained by polymerizing propylene in an inert medium (in general a hydrocarbon recovered from petroleum distillation) with the aid of catalysts prepared from organometallic compounds, preferably aluminum alkyls, and certain solid compounds, e.g. chlorides, of transition metals of Groups IVa, Va or VIa of the Periodic Table (Mendeléef), in which the metal has a valency lower than the maximum valency corresponding to its position in the Periodic Table.

The solid linear, regular head-to-tail propylene polymers thus produced usually comprise catalyst residues which are either chemically bound to the polymer chains or simply occluded in the polymer mass. Such catalyst residues decrease the resistance of the polymers to light and oxygen, and induce a more or less marked blackening of the polymer which is aesthetically objectionable, when the polymer is worked, as by molding or extrusion, at high temperatures.

At the same time, as a result of heating of the polymer, chlorides associated therewith are decomposed, with development of hydrochloric acid, which can corrode the apparatus.

It is important, therefore, to free the polymer completely of catalyst residues before processing it to obtain shaped articles thereof.

Polyethylene produced with the aid of similar catalysts presents the same problems. Various methods have been proposed for purifying the polyethylene from catalyst residues, including purifying methods involving acid hydrolysis and which, in practice, entail numerous problems arising from the unfavorable effects of the aqueous or alcoholic solutions.

Those processes which have been applied to ethylene polymers are not entirely satisfactory when applied to the linear, regular head-to-tail solid polymers of propylene. For instance, the methods involving acid hydrolysis present the practical problems and at the same time do not result in particularly pure polypropylenes.

It has also been proposed to free polyethylene obtained using catalysts prepared from titanium tetrachloride and aluminum alkyls of the catalyst residues by treating the impure polymer with steam simultaneously with or prior to the addition of strong mineral acids or fixed bases, in the presence or absence of wetting agents, and then finally washing the polymer with water. Purification of the polyethylene by treatment with alkaline solutions in the presence of emulsifiers has also been suggested.

However, these last-mentioned processes are either complicated in practice, prohibitively expensive, or do not give the desired results when applied to polypropylene.

Moreover, the use of wetting agents or, in general, emulsifiers must be avoided since those agents decrease the water-repellence of polypropylene and make it more difficult to dry the polymer.

We have found that, in the case of polypropylene, improved results can be obtained by subjecting the impure polypropylene to repeated successive treatments with an alcohol containing from 1 to 4 carbon atoms. The complex comprising the catalyst is very soluble in alcohols and can be almost completely removed by such treatments. However, because of the cost and consumption of the alcohol, and the many treatments of the polypropylene which are required, that method is too costly for practical commercial use.

We have now discovered a simpler, more economical method for removing residual catalyst from the polypropylene and which results in a polymer having a chlorine content and other properties which are at least comparable to those of the polymer obtained by repeated washing with alcohol.

The method of our present invention consists of the steps of (1) Diluting the polymerization reaction product with a dispersing medium for the polypropylene and which facilitates discharge of the polymer from the reactor;
(2) Filtering the polymer from the bulk of the dispersant;
(3) Subjecting the polymer to steam distillation to remove and completely recover the dispersing agent adhering to the polymer and to hydrolyze the catalyst, thus forming aluminum and transition metal hydroxides and hydrochloric acid;
(4) Freeing the polymer of the last traces of acid by leaching it with a dilute aqueous ammonia solution, preferably a solution having a concentration of 3 g./l., the leaching being effected in one or more successive steps.

This process is readily applicable to the impure polypropylene and is relatively economical. It results in a polypropylene of a purity which is satisfactory for all practical purposes, can be worked at elevated temperatures without objectionable blackening and is resistant to light and oxygen.

The present method can be carried out in various ways. For instance, the steam distillation and the leaching with aqueous ammonia can be carried out in the same polymerization apparatus, if it is provided with an efficient stirrer and if, all traces of water being removed from the reactor in order to avoid any unfavorable influence of the water on subsequent polymerization runs.

Also, and in some cases preferably, the polymer is filtered from the bulk of the dispersing agent and transferred to suitable apparatus for the distillation, leaching and final filtration steps. Since it is essential to dry the polymer completely, after the leaching, it is convenient to effect the leaching in an apparatus in which a high vacuum can be obtained so that the inhibition water can be practically completely eliminated.

The steps of the present method can be carried out continuously or batchwise. In any case, it is essential to control the temperature during the leaching with the aqueous ammonia solution so that it is maintained between 70° C. and 100° C., preferably between 75° C. and 80° C. The leaching is preferably repeated at least three times.

The present method is most successful when the residual catalyst content of the polpropylene is relatively small, e.g. from 0.5 to 1%. Polypropylene having the relatively low content of residual catalyst can be obtained by polymerizing propylene with the aid of a catalyst prepared from, e.g., an aluminum alkyl such as aluminum triethyl, and a chloride of a transition metal in which the metal has a valency lower than the maximum valency corresponding to its position in the Periodic Table, such as titanium trichloride, when the materials used, including the catalyst-forming components, the propylene and the inert hydrocarbon solvent, are very pure and the polymerization is effected under a pressure of 3–10 atmos., and at a temperature below the softening point of the polypropylene, while effectively stirring the polymerization mass. This method gives yields of about 150–250 g. polymer per gram of the whole catalyst introduced (sum of the catalyst components) and which generally have a residual catalyst content of less than 1%, or even less than 0.5%.

The following examples are given to illustrate the invention, it being understood that these examples are not intended as limiting.

*Example 1*

Propylene is polymerized in a reactor provided with a vertical stirrer, using a catalyst prepared from triethyl aluminum and titanium trichloride in a molar ratio of 2:1, with a catalyst concentration of 2.8 g./l. in an inert hydrocarbon solvent, for instance n-heptane. The polymerization is effected at 75° C., with a constant feed of propylene under 5 atm.

When the reaction is completed, a portion of the polymer obtained is introduced into a vacuum-tight 200 l. stainless steel vessel provided with a vertical stirrer and a filtering net placed at a few centimeters from the bottom. 45 l. of water are introduced, and the mass is then heated while stirring. At the same time, steam is introduced at the bottom of the vessel, and moves upwardly through the filtering net.

On the vessel there is placed a cooling device in which the water and heptane vapors are condensed and then collected in a separator (trap) which permits the recovery of about 97% of the heptane used. When separation of the condensed liquid into two layers ceases, the distillation is stopped, the warm polymer is filtered, the water is discharged from the bottom of the vessel through the filtering net, and 45 l. of water containing 135 g. $NH_3$ are introduced into the vessel.

The stirring is continued for 30 minutes at 90° C., after which the suspension is filtered, and the leaching operation is repeated under the same conditions.

After completion of the second leaching, the warm suspension is again filtered and the apparatus is evacuated in the heat.

Practically anhydrous polypropylene having a molecular weight of 290,000, and containing 85% of isotactic polymer, 0.21% ash and 0.02% chlorine is obtained.

*Example 2*

A 4 liter autoclave provided with a vertical stirrer is used. Into this vessel there are introduced 1500 cc. of commercial heptane, 2.5 g. $Al(C_2H_5)_3$, and 1.7 g. $TiCl_3$. The temperature is raised to 75° C., and propylene is introduced up to a pressure of 5 atm. The autoclave is kept at this temperature and pressure for 20 hours.

After that, the polymer is discharged and subjected to a steam treatment at 100° C. in a thermally insulated glass column, the solvent being thus recovered quantitatively.

After drying, the steam-treated polypropylene weighs 700 g., has a molecular weight of about 230,000, and an isotactic structure content of 85%. The ash content is 0.2%; the chlorine content is 0.17%.

The polymer is then introduced into a vessel provided with a rotating stirrer, together with 1500 cc. water containing 4.5 g. $NH_3$. After a leaching of 15 minutes the mass is filtered, and the leaching is repeated under the same conditions. After the second leaching, the polymer is dried and found to have the same ash content but a lower chlorine content (0.02%) due to the leaching.

*Example 3*

About 1500 cc. commercial heptane, 4.5 g. diethyl aluminum chloride, and 1.3 g. $TiCl_3$ are introduced into a 4 liter autoclave provided with a vertical stirrer. The autoclave is heated to 75° C. and propylene at 5 atm. is fed in continuously. When the reaction is completed the polymer is discharged and treated with steam at 100° C. in a thermally insulated glass column. The solvent is recovered almost completely.

The dried polymer weighs 850 g., has a molecular weight of 270,000, an ash content of 0.25% and a chlorine content of 0.20%. It is leached in a suitable vessel with 1800 cc. of water containing 5.4 g. $NH_3$. After 15 minutes, it is filtered and the leaching is repeated. The leached polymer, after drying, contains only 0.025% chlorine.

*Example 4*

Propylene is polymerized as described in preceding examples, using 2.20 g. triethyl aluminum and 2 g. $TiCl_3$, with a total catalyst concentration of 2.8 g. per liter of diluent. At the end of the polymerization run, the polymer is treated with steam at 100° C. and, after an almost quantitative recovery of the solvent, the polymer is leached with 2000 cc. water containing 5.5 g. $NH_3$.

After 15 minutes, the mixture is filtered, the leaching is repeated, and successively the polymer is filtered and dried.

1080 g. of 80% isotactic polypropylene having a molecular weight of 275,000, an ash content of 0.15%, and a chlorine content of 0.15% is obtained.

As is now well known, the term "isotactic" was originated by G. Natta to identify those linear, head-to-tail polypropylenes having substantially no branches longer than $CH_3$ produced and disclosed by him and his co-inventors which comprise a regular steric structure. In the isotactic structure, the —$CH_3$ groups attached to the tertiary asymmetric carbon atoms of adjacent monomeric units are all on one side of the main chain, and the hydrogen atoms attached to those carbon atoms are on the opposite side of the chain. The polypropylenes produced and purified in accordance with this invention have, at least predominantly, the isotactic structure.

Since variations may be made in details in carrying out the invention without departing from the spirit thereof, it is intended to include within the scope of the appended claims all such modifications and changes as may be apparent to those skilled in the art.

What is claimed is:

1. The method for substantially freeing from residual catalyst a polypropylene consisting predominantly of isotactic polypropylene and obtained by polymerizing propylene under a low pressure in an inert hydrocarbon dispersing agent for the polymer and in contact with catalysts prepared by (1) starting with a solid crystalline low valency chloride of a transition metal belonging to Groups IV to VI inclusive of the Mendeléef Periodic Table and (2) mixing the transition metal chloride with an alkyl compound of a metal belonging to Groups II to III inclusive of said table, and having a residual catalyst content not higher than 1%, which method consists essentially of the steps of filtering the polypropylene from the dispersing agent, subjecting the filtered polymer to steam distillation to remove completely the dispersing agent adhering to it and hydrolyze the catalyst with conversion of the catalyst-forming components to hydroxides and the formation of hydrochloric acid, leaching the steam-treated polymer with a dilute aqueous solution of ammonia to remove the acid, and heating the leached polymer under vacuum to dry the same.

2. The method according to claim 1, characterized in that the steam-treated polypropylene is leached with an aqueous solution of from 0.1% to 0.5% by weight of ammonia.

3. The method according to claim 1, characterized in that the steam-treated polypropylene is leached with an aqueous solution of from 0.1% to 0.5% of ammonia at a temperature of 70° C. to 100° C., and the leached polymer is dried at a temperature of 70° C. to 100° C.

4. The method for substantially freeing from residual catalyst a polypropylene consisting predominantly of isotactic polypropylene and obtained by polymerizing propylene under a low pressure in an inert hydrocarbon dispersing agent for the polymer containing, in an initial concentration not exceeding 3 g./liter, a catalyst prepared from solid crystalline titanium trichloride and an aluminum alkyl in a molar ratio of 1:1 to 1:5, which process consists essentially of the steps of filtering the polypropylene from the dispersing agent, subjecting the filtered polymer to steam distillation to remove dispersing agent adhering thereto and to hydrolyze the catalyst with conversion of the catalyst-forming components to aluminum hydroxide and titanium hydroxide and the formation of hydrochloric acid, leaching the steam-treated polymer with a dilute aqueous solution of ammonia to remove the acid, and heating the leached polymer under vacuum to dry the same.

5. The method according to claim 4, characterized in that the steam-treated polypropylene is leached with an aqueous solution of from 0.1% to 0.5% by weight of ammonia.

6. The method according to claim 4, characterized in that the steam-treated polypropylene is leached with an aqueous solution of from 0.1% to 0.5% of ammonia at a temperature of 70° C. to 100° C., and the leached polymer is dried at a temperature of 70° C. to 100° C.

References Cited in the file of this patent

UNITED STATES PATENTS

| | | |
|---|---|---|
| 2,474,671 | Hersberger | June 28, 1949 |
| 2,838,477 | Roelen et al. | June 10, 1958 |
| 2,867,612 | Pieper et al. | Jan. 6, 1959 |
| 2,882,264 | Barnes et al. | Apr. 14, 1959 |

FOREIGN PATENTS

| | | |
|---|---|---|
| 538,782 | Belgium | Dec. 6, 1955 |
| 526,101 | Italy | May 14, 1955 |